United States Patent
Sulzer

(10) Patent No.: US 7,479,707 B2
(45) Date of Patent: Jan. 20, 2009

(54) METHOD TO OPTIMIZE ALTERNATOR LOAD CAPABILITIES

(75) Inventor: Bryan D. Sulzer, Dubuque, IA (US)

(73) Assignee: Deere & Company, Moline, IL (US)

( * ) Notice: Subject to any disclaimer, the term of this patent is extended or adjusted under 35 U.S.C. 154(b) by 91 days.

(21) Appl. No.: 11/364,223

(22) Filed: Feb. 28, 2006

(65) Prior Publication Data

US 2007/0200347 A1 Aug. 30, 2007

(51) Int. Cl.
*F02D 29/06* (2006.01)
*H02P 9/00* (2006.01)

(52) U.S. Cl. ............................ 290/40 C; 322/44
(58) Field of Classification Search .............. 290/40 C, 290/40 R, 40 B, 46, 38 R; 322/44
See application file for complete search history.

(56) References Cited

U.S. PATENT DOCUMENTS

| | | | | |
|---|---|---|---|---|
| 4,155,080 A | * | 5/1979 | Kovacs ...................... 340/595 |
| 5,321,231 A | * | 6/1994 | Schmalzriedt et al. ...... 219/497 |
| 5,550,445 A | * | 8/1996 | Nii ............................. 318/153 |
| 5,929,608 A | * | 7/1999 | Ibaraki et al. ................. 322/16 |
| 5,998,881 A | * | 12/1999 | Wind et al. ............... 290/40 A |
| 6,593,713 B2 | * | 7/2003 | Morimoto et al. ........... 318/139 |
| 6,622,804 B2 | * | 9/2003 | Schmitz et al. ............. 180/65.2 |
| 6,700,214 B2 | * | 3/2004 | Ulinski et al. ............. 290/40 C |
| 6,883,495 B1 | | 4/2005 | Strauss |
| 7,116,068 B2 | * | 10/2006 | Boesch et al. ............... 318/254 |
| 2004/0108149 A1 | * | 6/2004 | Adachi et al. .............. 180/65.2 |
| 2004/0174018 A1 | * | 9/2004 | Itoh ......................... 290/40 C |
| 2005/0076885 A1 | * | 4/2005 | Strauss .................. 123/339.18 |

* cited by examiner

*Primary Examiner*—Julio Gonzalez
(74) *Attorney, Agent, or Firm*—Baker & Daniels LLP

(57) ABSTRACT

A method of controlling an idle speed of an engine of a vehicle includes evaluating a plurality of instantaneous current requirements of the vehicle at respective points in time. The engine is a variably set to idle speeds based upon the evaluated instantaneous current requirement of the vehicle such that the idle speeds are above minimum engine idle speeds required to produce alternator output currents that satisfy the evaluated instantaneous current requirements of the vehicle.

7 Claims, 4 Drawing Sheets

METHOD TO OPTIMIZE ALTERNATOR LOAD CAPABILITIES

BACKGROUND OF THE INVENTION

1. Field of the Invention

The present invention relates to alternators and, more particularly, to a method of setting the idle speed of an alternator.

2. Description of the Related Art

An alternator is used to convert mechanical energy provided by an engine into electrical energy for operating electrical components and for recharging a battery. When an engine is running at idle speed, the alternator continues to provide current for operating electrical components and for recharging the battery. It may be desirable to set an appropriate engine idle speed that results in a corresponding level of output current for the alternator such that the battery may continue to supply adequate power to vehicle accessories, yet alternator wear and fuel consumption are maintained at an acceptable level. There is an engineering trade off between alternator wear and fuel consumption. The lower the engine idle speed and corresponding fuel consumption, the higher the internal alternator current that is required to produce a given level of alternator output current. The higher the internal alternator current, the higher the internal alternator temperature and the greater the rate of wear on the alternator, particularly on the brushes and windings.

It is known to set the engine idle speed to a constant level whereat a sufficient level of alternator output current is provided to the battery under all load conditions. For example, the engine idle speed may be set to a constant level that is sufficient for battery charging even when the battery is depleted and all accessories are operating under the most extreme environmental conditions. A problem with this method, however, is that the engine idle speed is set to a level that is much higher than necessary under most operating conditions. The higher engine idle speed results in unnecessary fuel consumption, engine noise and engine wear.

It is also known, in the outboard motor industry, such as used in small watercraft, to sense the instantaneous current needs of the motor and accessories, and to continually readjust the motor idle speed to the minimum speed necessary to enable the alternator to meet the instantaneous current needs. A problem with this method is that running the alternator at minimum rotational speed requires a maximum internal alternator current in order to produce the needed output current. The maximum internal alternator current results in high internal alternator temperatures and high levels of alternator wear, particularly to the alternator brushes and windings. This method may work well for watercraft, which typically have unlimited moving water available for cooling, and which typically have limited operating hours that an alternator may endure for the life of the watercraft even under stressful conditions. However, the method is less desirable for vehicles that operate in less favorable cooling conditions, and whose lives typically include many more operating hours, such as tractors. In these high operating hour applications, the high internal currents may cause the alternator to fail prematurely.

Another problem with running the alternator at a minimum rotational speed is that a relatively large alternator must be used in order to output the required current. Although the minimum idle speed may reduce the rate of fuel consumption and noise under idle conditions, at normal operating speeds the relatively large alternator puts a greater mechanical load on the engine, which results in greater fuel consumption and noise at operating speed. This too may not be a problem for a watercraft, which typically spends a large percentage of its time idling, but it is not desirable for a tractor which spends a greater percentage of its time at normal operating speed.

What is needed in the art is a method of setting engine idle speed to a variable level that does not waste fuel at idle under less-than-maximal current load conditions, but yet does not unduly burden the alternator and does not increase fuel consumption at operating speed.

SUMMARY OF THE INVENTION

The present invention provides an idle speed control system in which the engine idle speed is set and continually readjusted to a level such that a current output capability of an alternator is marginally above the instantaneous current needs of the vehicle.

The invention comprises, in one form thereof, a method of controlling an idle speed of an engine of a vehicle. A plurality of instantaneous current requirements of the vehicle at respective points in time are evaluated. The engine is variably set to idle speeds based upon the evaluated instantaneous current requirement of the vehicle such that the idle speeds are above minimum engine idle speeds required to produce alternator output currents that satisfy the evaluated instantaneous current requirements of the vehicle.

The present invention comprises, in another form thereof, an idle speed control system for an engine of a vehicle. The system includes an alternator that supplies current to the vehicle. An engine is rotatingly coupled to the alternator. At least one sensor senses an instantaneous current requirement of the vehicle. A controller is in communication with the at least one sensor. The controller sets the engine to an idle speed at which a current output capability of the alternator is above the instantaneous current requirement and at which the current output capability of the alternator has a predetermined mathematical relationship to the instantaneous current requirement.

The present invention comprises, in yet another form thereof, a method of controlling an idle speed of an engine of a vehicle, including sensing an instantaneous current requirement of the vehicle. The engine is set to an idle speed at which a current output capability of an alternator is above the instantaneous current requirement and at which the current output capability of said alternator has a predetermined mathematical relationship to the instantaneous current requirement.

An advantage of the present invention is that the higher engine idle speed enables a desired alternator idle output current to be achieved with a lower internal alternator current, thereby resulting in a lower internal alternator temperature, perhaps less wear on the alternator, and perhaps a longer alternator life.

Another advantage is that the higher engine idle speed enables a desired alternator idle output current to be achieved with a smaller, less expensive alternator. The smaller alternator puts a lesser mechanical load on the engine. Thus, at normal engine operating speeds, it is possible to achieve greater fuel efficiency, less exhaust, and less noise.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
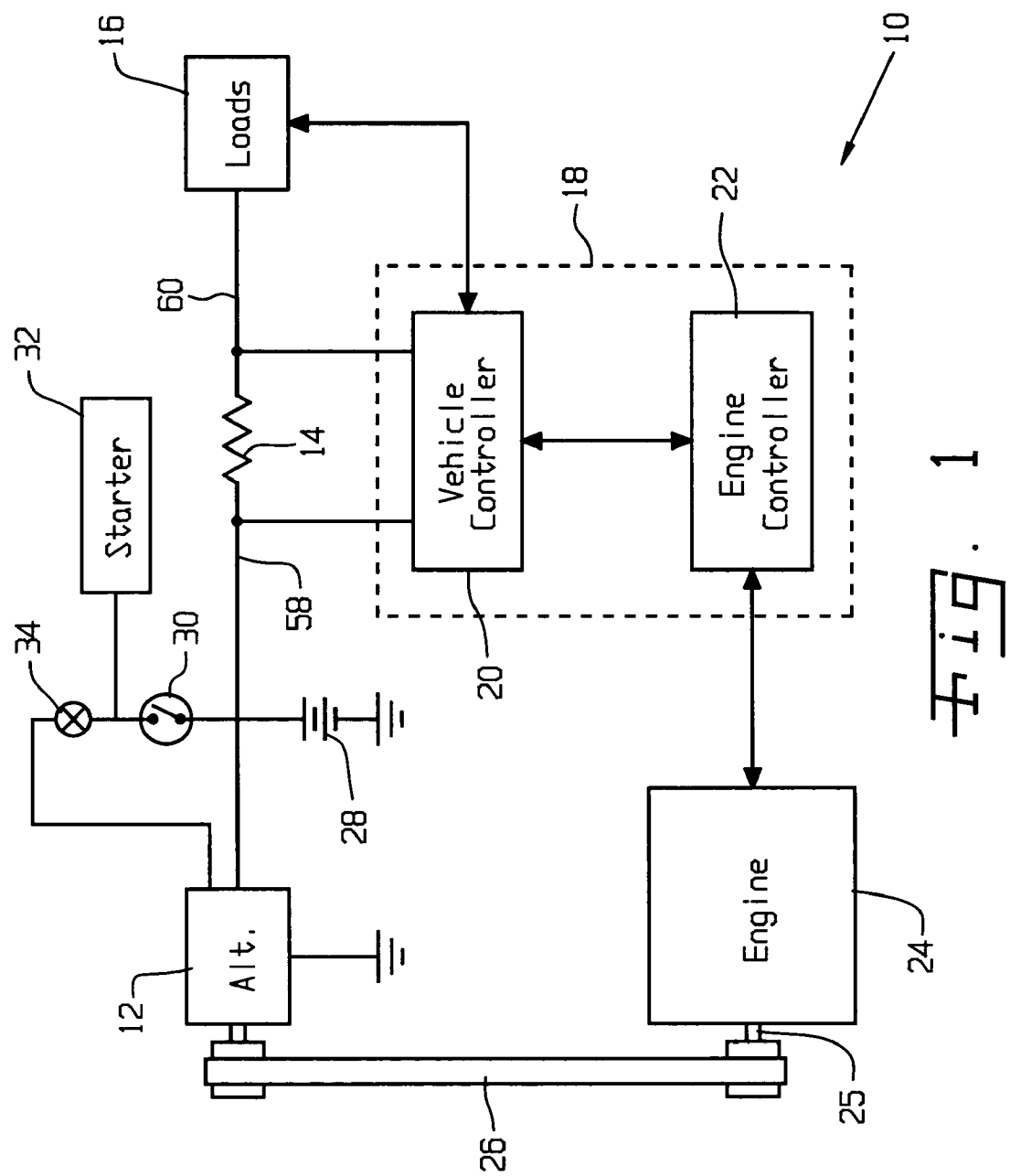
FIG. 1 is a block diagram of one embodiment of an engine idle speed control system of the present invention.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

FIG. 1 illustrates one embodiment of an engine idle speed control system 10 of the present invention for a vehicle such as a tractor. System 10 includes an alternator 12, a current sensor in the form of a low impedance shunt 14, a number of current-drawing load devices 16, an electronic controller 18 including a vehicle controller 20 and an engine controller 22, and an engine 24 having a crankshaft 25 that rotatingly drives alternator 12 via a belt 26. Load devices 16 may be in the form of any current-drawing device on the vehicle. For example, load devices 16 may include lights, ignition coils or spark plugs for engine 24, accessory motors, entertainment devices, electronics, etc. Engine 24 may be a diesel engine that is rotatingly coupled to alternator 12. System 10 may also include a battery 28 which is recharged by alternator 12, a starter motor switch 30, a starter motor 32 for starting engine 24, and an alternator indicator light 34.

Figure 2:
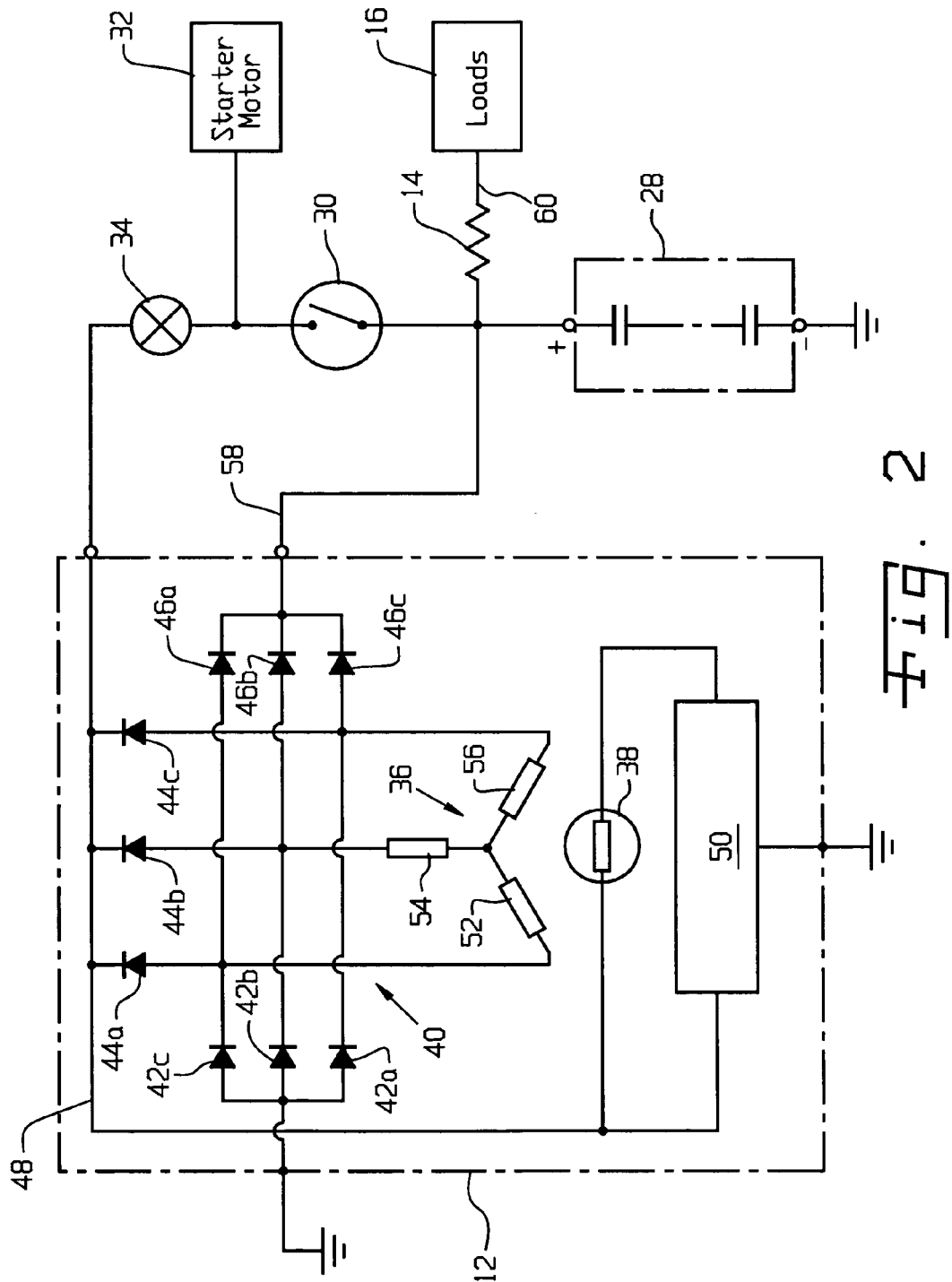
FIG. 2 is a schematic diagram of one embodiment of the alternator of FIG. 1 connected to a load including a battery.

Details of alternator 12 are discussed with reference to FIG. 2. In one embodiment, alternator 12 is a fourteen volt, twelve pole, self-induced synchronous generator. A current coil 36 forms a stator, and an exciting coil 38 forms a rotor. A rectifier 40 includes diodes 42 *a-c*, 44 *a-c* and 46 *a-c*. Rectifier 40 provides exciting current to exciting coil 38 via node 48, regulator 50, two carbon brushes (not shown) and slip rings (not shown). Rotor coil 38 may be supported by two permanently lubricated bearings (not shown) such that coil 38 may be rotatingly driven by crankshaft 25 via belt 26. As is evident in FIG. 2, stator windings 52, 54, 56 are Y-connected, and their outer ends are electrically connected to diodes 42, 44, 46. The direct current flows through diodes 46 *a-c* and node 58 directly into the positive pole of battery 28.

Stator current coil 36 generates alternating current in response to the rotating magnetic field produced by rotor exciting coil 38. The alternating current is then transformed into direct current by rectifier diodes 42, 44, 46. Alternating current is generated in each of stator windings 52, 54, 56. During the course of one revolution of rotor exciting coil 38, the voltage in each of stator windings 52, 54, 56 goes through one complete cycle. That is, the voltage in each of stator windings 52, 54, 56 rises from zero to the positive maximum, drops to zero, falls to the negative minimum, and rises back to zero. Because stator windings 52, 54, 56 are Y-connected, the phases of the voltage waveforms within stator windings 52, 54, 56 are shifted or offset by 120° from one another, and thus a three-phase or alternating current is generated.

Regulator 50 may be sealed and may operate to regulate the alternator voltage. In one embodiment, regulator 50 limits the alternator voltage to approximately fourteen volts.

In operation, according to the invention, system 10 may measure or estimate the instantaneous current requirements of loads 16 and may select a rotational speed of rotor 38 accordingly, as described in detail below. For example, shunt 14 may be used to measure the instantaneous current draws of loads 16 and/or the instantaneous current output of alternator 12. More particularly, shunt 14 may have a fixed, known resistance, and vehicle controller 20 may measure and monitor the instantaneous voltage drops across shunt 14. That is, controller 20 may measure the voltage difference between nodes 58 and 60 at different points in time. Vehicle controller 20 may then calculate, based upon the known resistance of shunt 14 and the instantaneous voltage drops across shunt 14, the corresponding instantaneous currents being drawn by loads 16. Shunt 14 is just one type of current sensor that may be used in conjunction with the present invention, and it is to be understood that the present invention may include any type of current/power meter or current/power sensing device.

As an alternative to measuring the actual current draw, it is also possible within the scope of the present invention to estimate the current draw of loads 16 and to select a rotational speed of rotor 38 based upon that estimate. For example, vehicle controller 20 may communicate with each of loads 16 in order to identify or determine which of load devices 16 is enabled or "turned on" and is thus likely to draw current. Vehicle controller 20 may establish a level of current draw for each of load devices 16. Specifically, vehicle controller 20 may store in memory a typical or average current draw of each of load devices 16, and thus may estimate the total instantaneous current draw by summing the stored typical/average current draw of each of the enabled load devices 16. Vehicle controller 20 may poll load devices 16 with any desired frequency, e.g., every two seconds, in order to determine which of devices 16 are enabled and to update the estimated total current draw of load devices 16.

Other factors may also be used in estimating total current draw. For example, vehicle controller 20 may sense environmental conditions that affect current draw. The total current draw of loads 16 may be at least partially based upon the sensed environmental conditions. Such environmental conditions may include ambient temperature, temperatures of the components of the vehicle, electrical resistances of various components and conduits, and time elapsed since engine 24 was started, for example.

After vehicle controller 20 has evaluated the instantaneous current requirements of the vehicle, either by estimating or by sensing and measuring, the instantaneous current requirements may be communicated to engine controller 22. Engine controller 22 may then set the rotational speed of engine 24, and consequently of alternator 12, based upon the instantaneous current requirements. More particularly, engine controller 22 may use a lookup table that is stored in memory and that relates each of a list of instantaneous current requirements to a corresponding desired rotational speed of engine 24 and/or of alternator 12. It is understood that the rotational speed of engine 24 may or may not be equal to the rotational speed of the alternator that the engine drives. However, the rotational speed of the engine may be at least proportional to the rotational speed of the alternator. Alternatively, engine controller 22 may make use of a stored formula that provides a desired rotational speed as a function of instantaneous current requirements.

Figure 3:
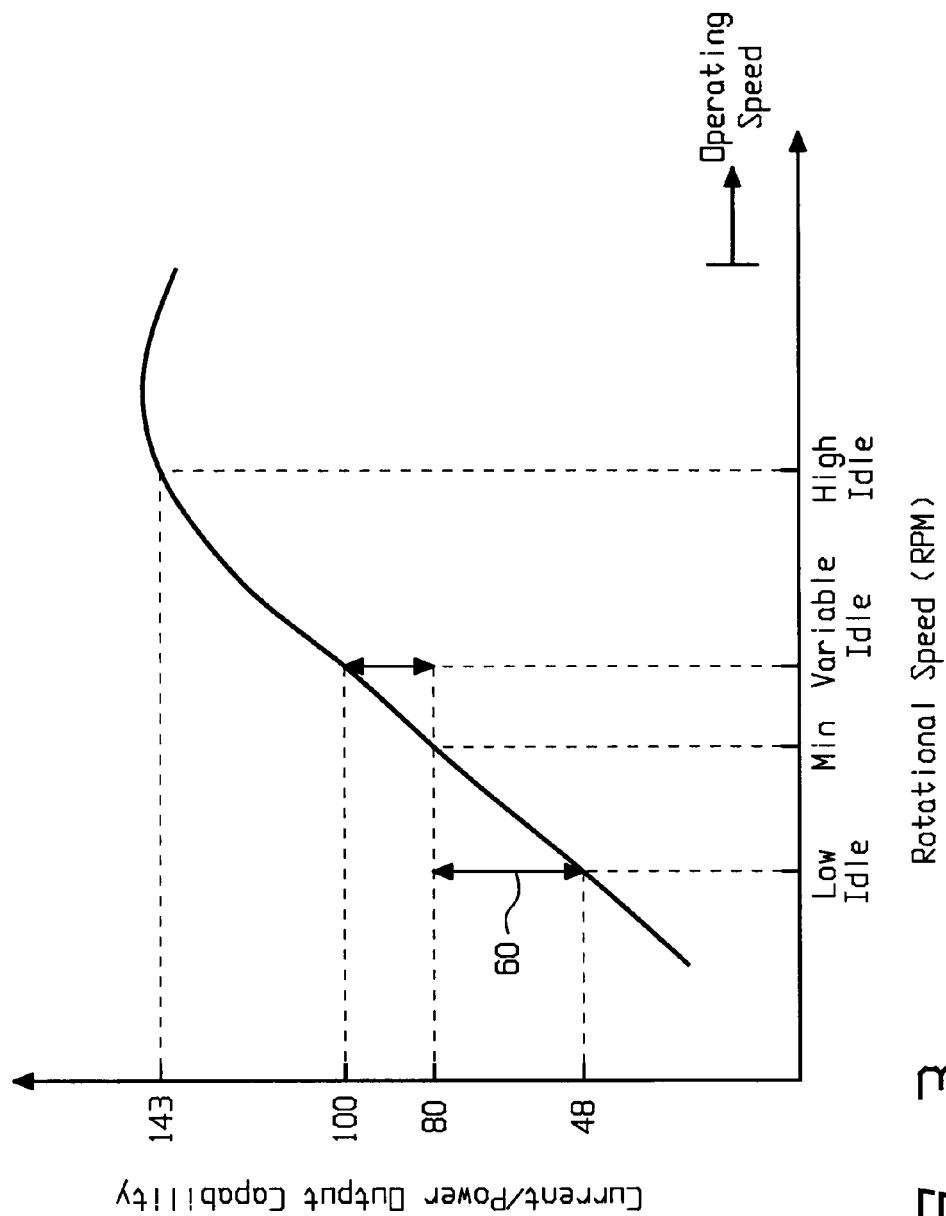
FIG. 3 is a normalized plot of current or power output versus rotational speed for the alternator of FIG. 1.

A plot of normalized current and/or power output capability of alternator 12 as a function of rotational speed is shown in FIG. 3. Because the output voltage of alternator 12 is essentially constant, the alternator's current output capability is proportional to its power output capability. In the plot, the normalized instantaneous current/power requirements of a vehicle under different conditions may range from about 48 to about 143, which numbers are given for reference only, and are not indicative of any particular current or power levels. However, in one particular application, the range of a vehicle's instantaneous power requirements is estimated to be from about 1600 watts to 4800 watts.

At idle, it is known to set the rotational speed of the alternator to a fixed speed that does not vary with the instantaneous current/power requirements of the vehicle. For example, upon sensing an idling condition in which the accelerator or throttle is at its lowest setting, the alternator may be set to a speed identified as "high idle" in FIG. 3, which speed corresponds to an alternator current/power output capability of 143 that approximately matches the maximum current/power needs of the vehicle. At this high idle speed, it can reasonably be assured that the current/power needs of the vehicle will be met under any conditions. A drawback, however, is that, under most conditions, the engine operates at a higher speed than is necessary, thereby resulting in wasted fuel and excess noise and exhaust.

At the other end of the spectrum, the alternator may be set to a speed identified as "low idle" in FIG. 3 when an idling condition is sensed. At this low idle speed, the current/power produced by the alternator must be supplemented with current/power from the battery in order to meet the current/power requirements of the vehicle under most conditions. For example, if the vehicle has a normalized current/power requirement of 80, and alternator 12 is capable of outputting a normalized current/power level of only 48 at the "low idle" speed, then difference 60, having a normalized value of 32, must be made up by drawing current from battery 28. Drawbacks of this operating technique include a reduction in battery life due to the constant current draw on the battery, and perhaps sometimes not being able to meet the current/power needs of the vehicle.

It is also possible to select some fixed rotational speed between the low idle speed and the high idle speed. However, any fixed rotational speed that is selected will be either too high or too low under most conditions, resulting in the drawbacks described above.

According to the present invention, the idle alternator speed is set and continually re-adjusted dependent upon the evaluated instantaneous current/power requirements of the vehicle. More particularly, the idle speed is set equal to a speed that is a marginal amount above a speed at which the current/power output capability matches the instantaneous current/power requirements of the vehicle. That is, engine 24 may be set to an idle speed at which a current output capability of alternator 12 is above the instantaneous current requirement and at which the current output capability of alternator 12 has a predetermined mathematical relationship to the instantaneous current requirement.

Illustrated in FIG. 3 is one embodiment of the present invention in which the idle speed is set such that the current output capability of alternator 12 has a predetermined mathematical relationship to the instantaneous current requirement. More particularly, assuming that an instantaneous current requirement as been evaluated as being at a normalized value of 80, then the engine/alternator may be set to an idle speed, labeled "variable idle" in FIG. 3, at which the current output capability of the alternator is 25% greater than the instantaneous current requirement. Or, in other words, the engine is set to an idle speed such that the vehicle's instantaneous current requirement is 20% below the alternator's current output capability at the idle speed. In the embodiment shown in FIG. 3, the engine/alternator may be set to an idle speed at which the current output capability of the alternator has a normalized value of 100. Thus, in this embodiment, the predetermined mathematical relationship is in the form of the current output capability being a predetermined percentage, e.g., 25%, above the instantaneous current requirement of 80. By providing the 25% margin in the current output capability over the instantaneous current requirement, i.e., by running alternator 12 at the "variable idle" speed, the alternator may meet the instantaneous current requirement of 80 with an internal current that is substantially below what the internal current would be if the alternator were run at a minimum speed (labeled "min" in FIG. 3) required to meet the instantaneous current requirement of 80. This lower internal alternator current results in less wear on alternator brushes and windings, and a longer useful life of the alternator.

Of course it is possible within the scope of the invention for the predetermined mathematical relationship between the current output capability of alternator 12 and the instantaneous current requirement to be other than a percentage difference. For example, the idle speed may be set such that the current output capability of the alternator is a predetermined amount, e.g., a predetermined amperage such as five amperes, above the instantaneous current requirement.

As another alternative, a predetermined mathematical relationship may be provided between the minimum engine idle speed required to produce an alternator output current that satisfies the evaluated instantaneous current requirement of the vehicle and the idle speed as actually set by engine controller 22. For example, if the evaluated instantaneous current requirement of the vehicle is the normalized value of 80 shown in FIG. 3, then the engine idle speed may be set to some predetermined amount, such as 100 revolutions per minute, above the "min" speed required for the alternator to output a normalized current/power value of 80.

Regardless of which of the above-described methods is employed in setting the engine idle speed, the engine idle speed may be re-adjusted with each new evaluation of the instantaneous current requirements. Further, the instantaneous current requirements may be re-evaluated with any desired frequency, ranging from multiple times per second to once every several minutes.

Figure 4:
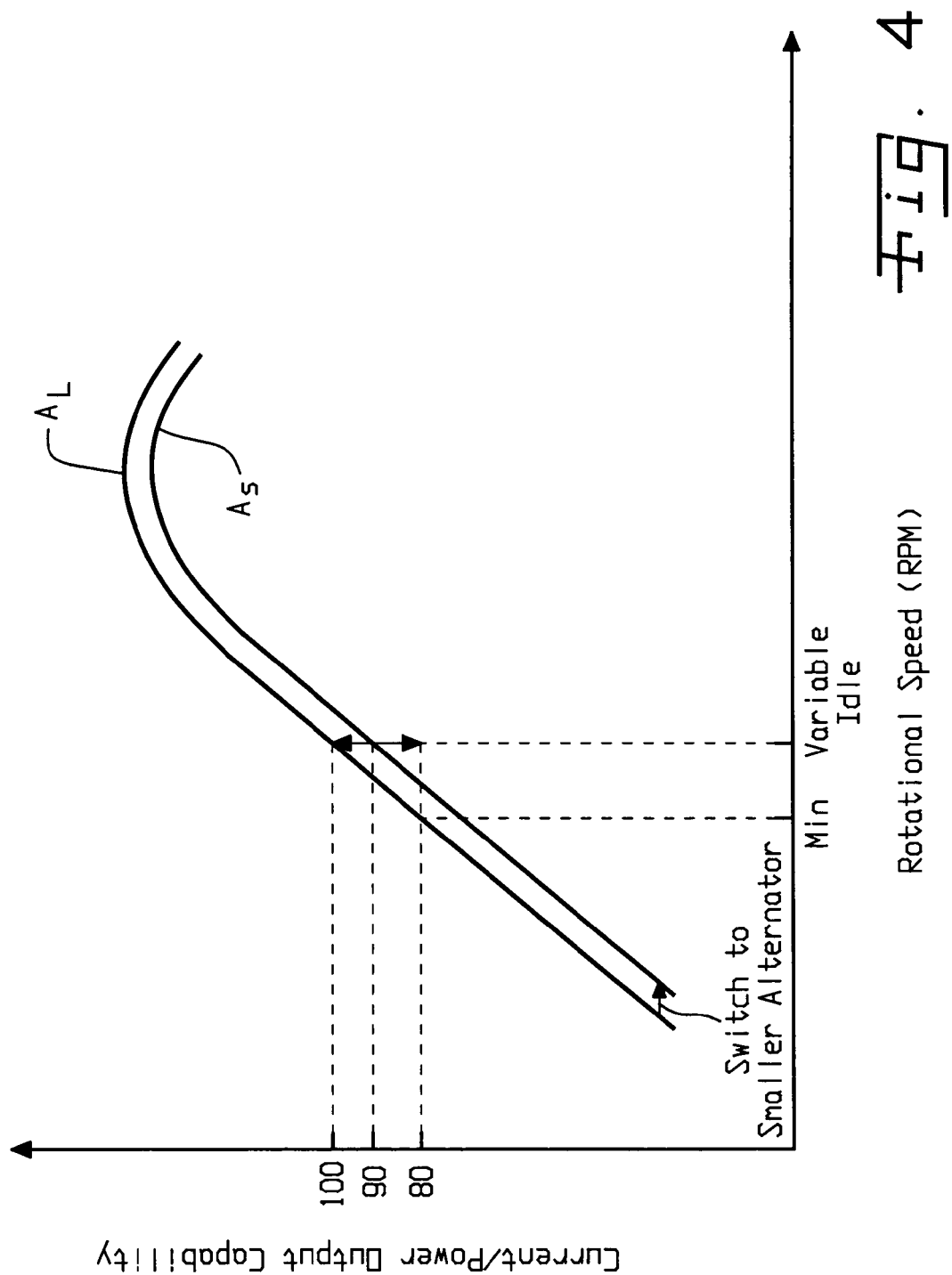
FIG. 4 is a normalized plot of current or power output versus rotational speed for another embodiment of an alternator suitable for use in conjunction with the present invention.

Because, according to the present invention, the alternator is operated at idle rotational speeds at which the alternator's current/power output capability is greater than the instantaneous current requirements, it is possible to switch to a smaller alternator with its associated advantages and still retain the other advantages of the present invention. This is illustrated in FIG. 4, which is a normalized plot of current/power output capability versus rotational speed for two alternators of different sizes. The upper plot, labeled $A_L$, is representative of the alternator performance depicted in FIG. 3 (for a "larger alternator"). The lower plot, labeled $A_S$, is representative of the performance of a smaller, alternative alternator which may be used in conjunction with the present invention. As is evident from a comparison of the two plots, the smaller alternator has a lower current/power output capability than the larger alternator for any given rotational speed. However, the smaller alternator has the offsetting advantages of being less expensive and providing a lower mechanical load on the engine. Thus, use of the smaller alternator may result in greater fuel efficiency at normal operating speed, where the engine may spend the majority of its time. As shown in the plot, the smaller alternator may be run at the same idle speed ("variable idle") as the larger alternator. At this "variable idle" speed, the current/power output capability of the smaller alternator is at a normalized value of 90, which is lower than the normalized value of 100 of the larger alternator, but still significantly above the instantaneous current requirement of 80. Thus, use of the smaller alternator retains all of the advantages of the present invention, which are described above with reference to FIGS. 1-3, while adding the advantages of a less expensive alternator and better fuel efficiency at normal operating speed.

While this invention has been described as having an exemplary design, the present invention may be further modified within the spirit and scope of this disclosure. This application is therefore intended to cover any variations, uses, or adaptations of the invention using its general principles.

What is claimed is:

1. An idle speed control system for an engine of a vehicle, said system comprising:
   an alternator configured to supply current to the vehicle;
   an engine rotatingly coupled to said alternator;
   at least one sensor configured to sense an instantaneous current requirement of the vehicle; and
   a controller in communication with said at least one sensor, said controller being configured to set the engine to an idle speed at which a current output capability of said alternator is above the instantaneous load requirement and at which the current output capability of said alternator has a predetermined mathematical relationship to the instantaneous load requirement,
   wherein the predetermined mathematical relationship comprises the current output capability being a predetermined percentage above the instantaneous load requirement.

2. The system of claim 1 wherein said controller comprises a vehicle controller and an engine controller.

3. The system of claim 1 wherein said at least one sensor comprises a low impedance shunt receiving the alternator output current.

4. The system of claim 1 wherein said controller sets the engine idle speed by use of a lookup table.

5. The system of claim 1, wherein the predetermined percentage is approximately twenty-five percent.

6. An idle speed control system for an engine of a vehicle, said system comprising:
   an alternator configured to supply current to the vehicle;
   an engine rotatingly coupled to said alternator;
   at least one sensor configured to sense an instantaneous load requirement of the vehicle; and
   a controller in communication with said at least one sensor, said controller being configured to set the engine to an idle speed at which a current output capability of said alternator is above the instantaneous load requirement and at which the current output capability of said alternator has a predetermined mathematical relationship to the instantaneous load requirement,
   wherein the predetermined mathematical relationship comprises the current output capability being a predetermined amount above the instantaneous load requirement.

7. The system of claim 6, wherein the predetermined amount is approximately 5 amperes.

* * * * *